(12) United States Patent
Osterling

(10) Patent No.: US 12,375,230 B2
(45) Date of Patent: *Jul. 29, 2025

(54) COMPRESSING USER DATA TRANSMITTED BETWEEN A LOWER LAYER SPLIT CENTRAL UNIT AND A RADIO UNIT USING BITMAP REPRESENTATIONS

(71) Applicant: TELEFONAKTIEBOLAGET LM ERICSSON (PUBL), Stockholm (SE)

(72) Inventor: Jacob Osterling, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,398

(22) Filed: Aug. 2, 2023

(65) Prior Publication Data

US 2023/0379106 A1    Nov. 23, 2023

Related U.S. Application Data

(63) Continuation of application No. 17/275,340, filed as application No. PCT/IB2019/058356 on Oct. 1, 2019, now Pat. No. 11,722,269.

(Continued)

(51) Int. Cl.
*H04L 5/00* (2006.01)
*H04L 69/04* (2022.01)

(52) U.S. Cl.
CPC .......... *H04L 5/0044* (2013.01); *H04L 5/0091* (2013.01); *H04L 69/04* (2013.01)

(58) Field of Classification Search
CPC ..... H04L 5/0044; H04L 5/0091; H04L 69/04; H04L 5/0048
See application file for complete search history.

(56) References Cited

U.S. PATENT DOCUMENTS 10,833,747 B2    11/2020    Muruganathan et al.
10,886,976 B2 *   1/2021    Rajagopal ............ H04B 7/0848
(Continued)

FOREIGN PATENT DOCUMENTS

CA    3052785 A1    8/2018
EP    3455992 B1    3/2019
(Continued)

OTHER PUBLICATIONS

Garyantes, "xRAN Fronthaul Working Group; Control, User and Synchronization Plane Specification", Technical Specification, XRAN-FH.CUS.0-v01.00, Apr. 4, 2018, pp. 1-62.
(Continued)

*Primary Examiner* — Jay P Patel
(74) *Attorney, Agent, or Firm* — Ericsson Inc.

(57) ABSTRACT

A method for transmitting user data from a lower-layer split central unit (LLS-CU) to a radio unit (RU) in a network node of a wireless communication system for transmission by the RU over a wireless interface includes mapping reference symbols to be transmitted by the RU to resource elements to provide mapped data. The mapped data including the references symbols is compressed using a bitmap representation of the mapped data to obtain compressed data. The compressed data is transmitted from the LLS-CU to the RU.

15 Claims, 11 Drawing Sheets

Related U.S. Application Data

(60) Provisional application No. 62/740,701, filed on Oct. 3, 2018.

(56) References Cited

U.S. PATENT DOCUMENTS

| | | | |
|---|---|---|---|
| 11,121,744 B2 | 9/2021 | Park et al. | |
| 11,122,427 B2 | 9/2021 | Ohlsson et al. | |
| 11,456,833 B2 | 9/2022 | Moon | |
| 2015/0078321 A1* | 3/2015 | Zhang | H04L 5/0035 370/329 |
| 2015/0215906 A1 | 7/2015 | Park et al. | |
| 2015/0264670 A1 | 9/2015 | Lee et al. | |
| 2015/0295652 A1* | 10/2015 | Luo | H03M 7/14 398/202 |
| 2015/0326324 A1 | 11/2015 | Lee et al. | |
| 2017/0237831 A1* | 8/2017 | Yang | H04B 1/66 370/230 |
| 2017/0251493 A1* | 8/2017 | Zhang | H04W 56/001 |
| 2017/0373890 A1* | 12/2017 | Fertonani | H04L 9/40 |
| 2018/0124762 A1* | 5/2018 | Zeng | H04L 5/0048 |
| 2018/0227028 A1* | 8/2018 | Lee | H04B 7/0456 |
| 2018/0294881 A1* | 10/2018 | Shibata | H03M 7/4031 |
| 2018/0323830 A1 | 11/2018 | Park et al. | |
| 2018/0368205 A1 | 12/2018 | Park et al. | |
| 2019/0007877 A1 | 1/2019 | Keller et al. | |
| 2019/0044580 A1 | 2/2019 | Zhou et al. | |
| 2019/0174391 A1 | 6/2019 | Ode et al. | |
| 2019/0261407 A1 | 8/2019 | Irukulapati et al. | |
| 2019/0350018 A1 | 11/2019 | Moosavi et al. | |
| 2019/0372641 A1 | 12/2019 | Muruganathan et al. | |
| 2020/0092718 A1 | 3/2020 | Ohlsson et al. | |
| 2020/0092838 A1 | 3/2020 | Koo | |
| 2020/0120559 A1 | 4/2020 | Centonza et al. | |
| 2020/0128601 A1 | 4/2020 | Willars et al. | |
| 2020/0235788 A1* | 7/2020 | Rajagopal | H04B 7/0848 |
| 2020/0280872 A1 | 9/2020 | Fiorani et al. | |
| 2020/0328845 A1 | 10/2020 | Sundberg et al. | |
| 2020/0351633 A1 | 11/2020 | Höglund et al. | |
| 2020/0358575 A1 | 11/2020 | Moon et al. | |
| 2020/0374935 A1 | 11/2020 | Bergström et al. | |
| 2020/0374955 A1 | 11/2020 | Dudda et al. | |
| 2020/0389216 A1 | 12/2020 | He et al. | |
| 2020/0389219 A1 | 12/2020 | Muruganathan et al. | |
| 2020/0396772 A1 | 12/2020 | Tirronen et al. | |
| 2021/0029551 A1 | 1/2021 | Kazmi et al. | |
| 2021/0045160 A1 | 2/2021 | Irukulapati et al. | |
| 2021/0067770 A1 | 3/2021 | Andersson et al. | |
| 2021/0194634 A1 | 6/2021 | Sedlacek et al. | |
| 2021/0195635 A1 | 6/2021 | Wänstedt et al. | |
| 2021/0204244 A1 | 7/2021 | Rune et al. | |
| 2021/0298103 A1 | 9/2021 | Yilmaz et al. | |
| 2021/0298112 A1 | 9/2021 | Chen et al. | |
| 2021/0314809 A1 | 10/2021 | Teyeb et al. | |
| 2021/0329266 A1 | 10/2021 | Andersson et al. | |
| 2021/0337615 A1 | 10/2021 | Rugeland et al. | |
| 2021/0368427 A1 | 11/2021 | Rommer et al. | |
| 2021/0392657 A1 | 12/2021 | Ahmed | |
| 2021/0399769 A1 | 12/2021 | Park et al. | |
| 2022/0166585 A9 | 5/2022 | Rajagopal | |
| 2022/0173837 A1 | 6/2022 | Kainulainen et al. | |
| 2022/0407593 A1 | 12/2022 | Moon | |

FOREIGN PATENT DOCUMENTS

| | | | |
|---|---|---|---|
| EP | 3646639 B1 | 5/2020 | |
| JP | 2015142189 A | 8/2015 | |
| WO | WO-2017078464 A1 * | 5/2017 | H04B 7/024 |
| WO | 2017196253 A1 | 11/2017 | |
| WO | 2018145062 A2 | 8/2018 | |
| WO | 2018166326 A1 | 9/2018 | |
| WO | 2019001750 | 1/2019 | |
| WO | 2019053630 A1 | 3/2019 | |
| WO | 2019066692 A1 | 4/2019 | |
| WO | 2019103664 A1 | 5/2019 | |
| WO | 2019135656 A1 | 7/2019 | |
| WO | 2019158193 A1 | 8/2019 | |
| WO | 2019193411 A1 | 10/2019 | |
| WO | 2019216798 A1 | 11/2019 | |
| WO | WO-2019217391 A1 * | 11/2019 | H04B 7/0456 |
| WO | 2019231366 A1 | 12/2019 | |
| WO | 2020038548 A1 | 2/2020 | |
| WO | 2020060450 A1 | 3/2020 | |

OTHER PUBLICATIONS

NGMN Alliance, "NGMN Overview on 5G RAN Functional Decomposition" Next Generation Mobile Networks Ltd., Feb. 24, 2018, Version 1.0, pp. 1-47.

NTT Docomo, Inc. (Si rapporteur). "TR 38.816 v1.0.0." 3GPP TSG RAN #78 RP-172441, Dec. 11, 2017, www.3gpp.org/ftp/tsg_ran/TSG_RAN/TSGR_78/Docs/RP-172441.zip.

NTT Docomo, Inc., "TP on L 1 processing diagram", 3GPP TSG RAN WG3 Meeting #97bis, Prague, Czech, Oct. 9-13, 2017, pp. 1-8, R3-173878, 3GPP.

O-RAN Alliance, "O-RAN Fronthaul Control, User and Synchronization Plane Specification", O-RAN-WG4.CUS.0-v07.02, Sep. 2022.

O-RAN Working Group 4 (Open Fronthaul Interfaces WG) Control, User and Synchronization Plane Specification, O-RAN.WG4.CUS.0-V07.02, Technical Specification, May 2022, 9 Pages.

* cited by examiner $$\begin{bmatrix} 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 1 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 1 & 0 & 0 & 0 & 0 & 0 & 0 & 1 & 0 & 0 & 0 & 0 & 0 & 0 \end{bmatrix}$$

COMPRESSING USER DATA TRANSMITTED BETWEEN A LOWER LAYER SPLIT CENTRAL UNIT AND A RADIO UNIT USING BITMAP REPRESENTATIONS

RELATED APPLICATION

The present application is a continuation of U.S. application Ser. No. 17/275,340, filed on Mar. 11, 2021, which is a 371 of International Application No.: PCT/IB2019/058356, filed on Oct. 1, 2019, which claims the benefit of and priority to U.S. Provisional Patent Application No. 62/740,701, filed Oct. 3, 2018, entitled "COMPRESSING USER DATA TRANSMITTED BETWEEN A LOWER LAYER SPLIT CENTRAL UNIT AND A RADIO UNIT USING BITMAP REPRESENTATIONS," the disclosure of which are hereby incorporated herein by reference in their entirety.

BACKGROUND

The present disclosure relates generally to communications, and more particularly, to wireless communications and related wireless devices and network nodes.

FIG. 1 depicts an example of a wireless communication system 300 represented as a 5G network architecture composed of core network functions (NFs), where interaction between any two NFs is represented by a point-to-point reference point/interface.

Seen from the access side, the 5G network architecture shown in FIG. 1 includes a plurality of User Equipment (UEs) connected to either a Radio Access Network (RAN) or an Access Network (AN) by a wireless interface as well as an Access and Mobility Management Function (AMF). Typically, the R(AN) comprises base stations, such as evolved Node Bs (eNBs) or 5G base stations (gNBs) or similar. Seen from the core network side, the 5G core NFs shown in FIG. 1 include a Network Slice Selection Function (NSSF), an Authentication Server Function (AUSF), a Unified Data Management (UDM), an Access and Mobility Management Function (AMF), a Session Management Function (SMF), a Policy Control Function (PCF), and an Application Function (AF).

One of the aims of the 5G core network is to separate the user plane and control plane. The user plane typically carries user traffic while the control plane typically carries signaling in the network. In FIG. 1, the UPF is in the user plane and all other NFs (i.e., AMF, SMF, PCF, AF, AUSF, and UDM) are in the control plane. Separating the user and control planes enables each plane resource to be scaled independently. Such separation may also allow UPFs to be deployed separately from control plane functions in a distributed fashion.

SUMMARY

According to some embodiments, a method may be provided to transmit user data from a lower-layer split central unit (LLS-CU) to a radio unit (RU) in a network node of a wireless communication system for transmission by the RU over a wireless interface. The method can include mapping, at the LLS-CU, reference symbols to be transmitted by the RU to resource elements to provide mapped data. The method can further include compressing the mapped data including the references symbols using a bitmap representation of the mapped data to obtain compressed data. The method can further include transmitting the compressed data from the LLS-CU to the RU.

According to some other embodiments, a method may be provided to operate a radio unit in a network node. The method can include receiving the bitmap representation and the compressed data at the RU. The method can further include uncompressing the compressed data using the bitmap representation at the RU to recover the mapped data. The method can further include transmitting the mapped data over a wireless interface.

According to some embodiments of inventive concepts, a mechanism can be provided to reduce the bit rate on the fronthaul interface during low or normal operation of the radio, allowing for more efficient pooling of shared links.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
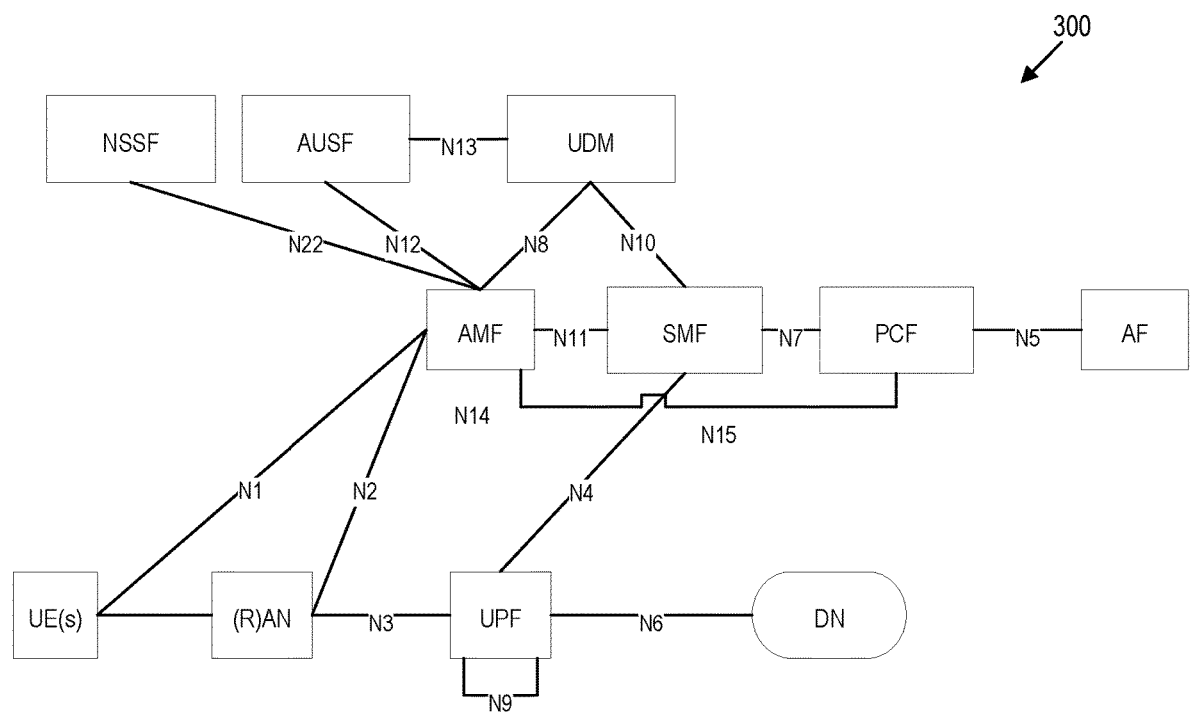
FIG. 1 is a block diagram illustrating an example of a wireless communication system representing 5th Generation Wireless System (5G) network architecture composed of core network functions (NFs)
Figure 2:
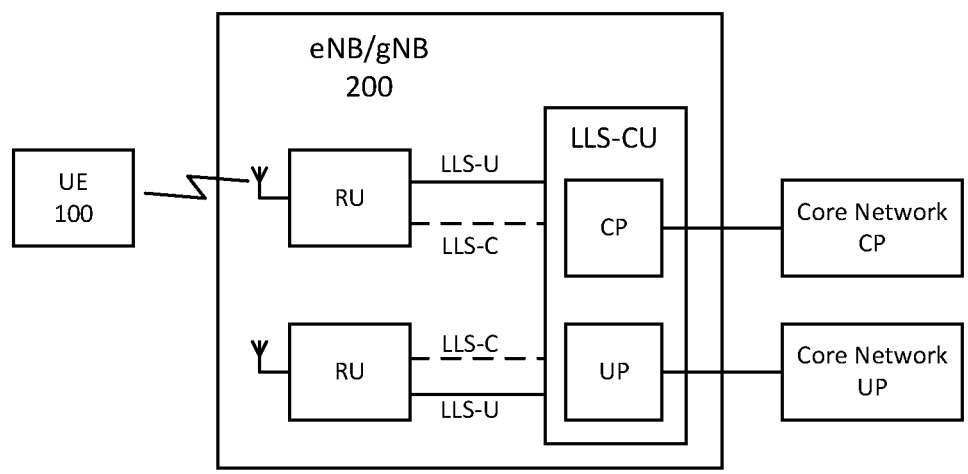
FIG. 2 is a block diagram illustrating an example of a network node including a lower-layer split central unit and a radio unit according to some embodiments.

FIG. 2 depicts an example of a RAN node 200 according to some embodiments. As illustrated in FIG. 2, the RAN node 200 may include an eNB or a gNB with a lower-layer split central unit (LLS-CU) and on or more radio units (RU) connected to the LLS-CU. The LLS-CU is capable of interacting with the RU(s) over the LLS-C control plane(s) and/or the LLS-U user plane(s) on the so-called "fronthaul." As illustrated, the LLS-CU is a logical node that includes the eNB/gNB functions as discussed below. In this regard, the LLS-CU controls the operation of the RU(s) in some embodiments discussed herein. The LLS-CU communicates with the control plane (CP) and user plane (UP) functions of a core network on the backhaul. The RUs transmit and receive downlink and uplink data, respectively, to/from one or more user equipment (UE) nodes 100 via a wireless interface.

Figure 3:
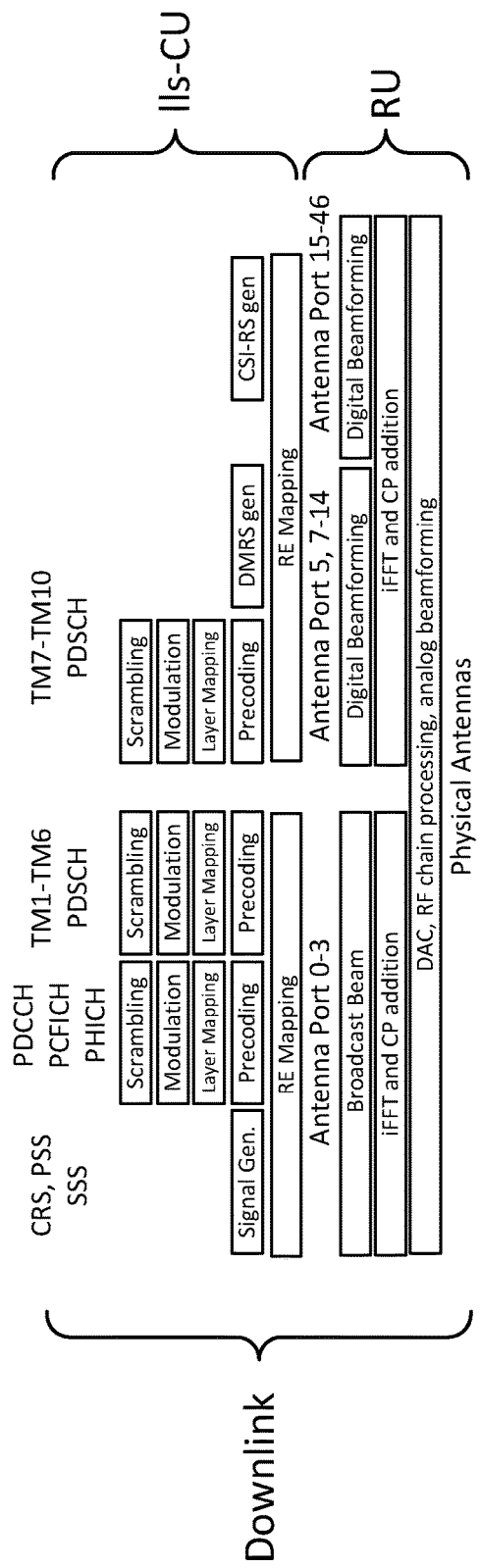
FIG. 3 is a diagram illustrating an example of downlink (DL) functional split for various physical layer channels and transmission modes.

FIG. 3 depicts a downlink (DL) functional split between the LLS-CU and the RU for various physical layer channels and transmission modes. In the DL, iFFT, CP addition, and digital beamforming functions may reside in the RU. Additional PHY functions, including resource element mapping, precoding, layer mapping, modulation, scrambling, rate matching, and coding may reside in the LLS-CU, according to some embodiments.

Figure 4:
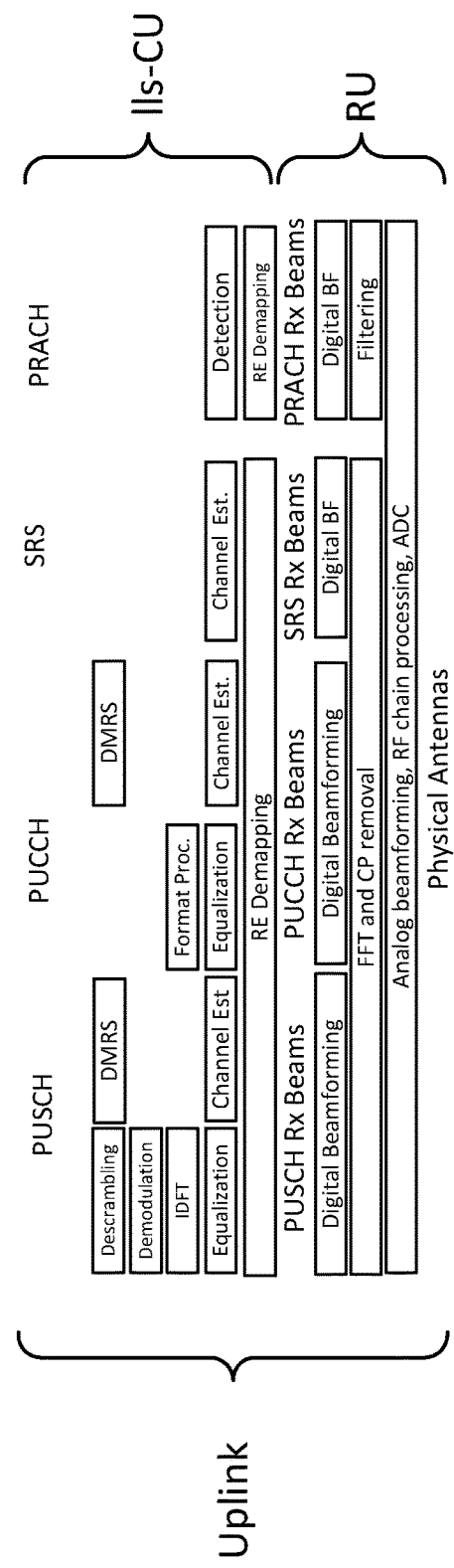
FIG. 4 is a diagram illustrating an example of uplink (UL) functional split for various physical layers channels and transmission modes.

FIG. 4 depicts an uplink (UL) functional split for various physical layer channels and transmission modes. As illustrated in FIG. 4, in the UL, FFT, CP removal, and digital beamforming functions may reside in the RU. Additional PHY functions, including resource element de-mapping, equalization, de-modulation, de-scrambling, rate de-matching, and de-coding, can reside in the LLS-CU, according to some embodiments.

Figure 5:
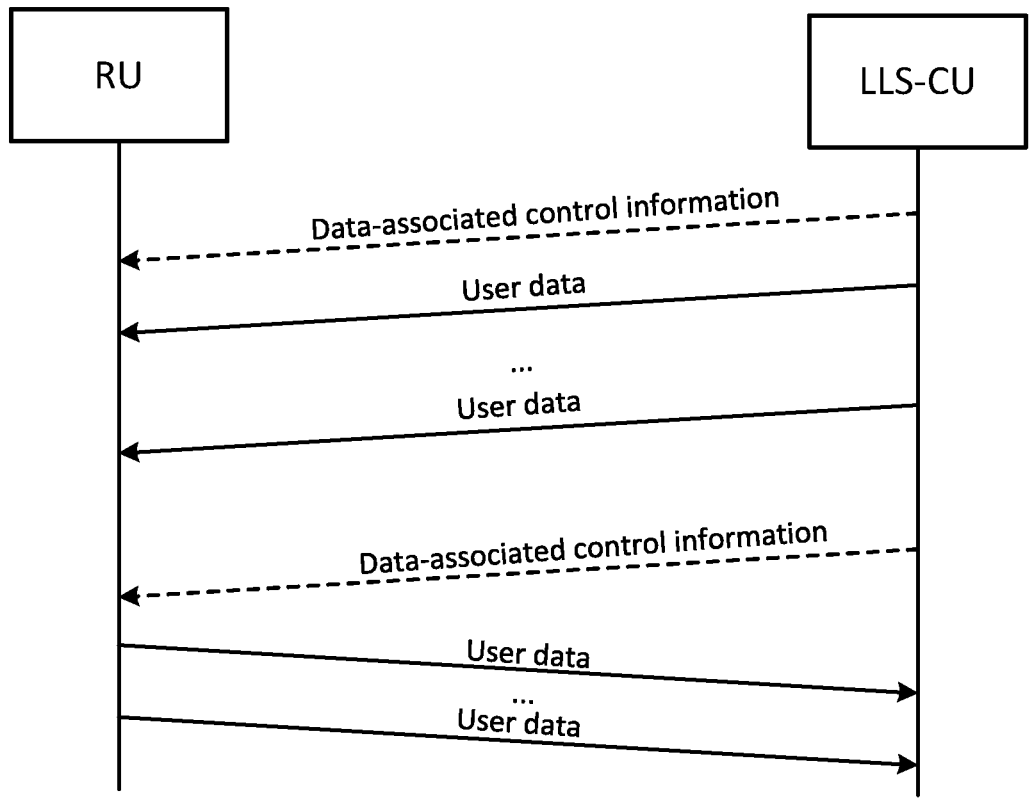
FIG. 5 is a signal flow diagram illustrating an example of operations in a wireless communication network according to some embodiments.

As illustrated in FIG. 5, control plane (CP) messages may be exchanged between an LLS-CU and an RU according to a scheduling and beamforming commands transfer procedure. One purpose of CP messages is to transmit data-associated control information (DACI) required for the processing of user data. For example, in some embodiments, this may include scheduling and/or beamforming commands. Messages may be sent separately for DL-related commands and UL-related commands, as illustrated in FIG. 5. Likewise, for purposes including increased flexibility, CP messages may be sent either jointly or separately depending on the channel for which information is conveyed. For example, PUCCH and PUSCH may be bundled or not bundled into a single CP message depending on implementation.

In some embodiments disclosed herein, method and devices related to transmitting losslessly compressed user data between a LLS-CU and an RU are provided. In some embodiments disclosed herein, interfacing between a LLS-CU, such as a central unit and or a baseband unit, and an RU, supporting 3GPP LTE and NR, is provided.

In some embodiments, a method includes transmitting data-associated control information messages (DACI) from an LLS-CU to an RU. In some embodiments, the DACI includes information that defines how the RU should handle User Data messages that are transferred from the LLS-CU to the RU, wherein the DACI includes content to be transmitted over the air. In other embodiments, the DACI includes controlling how data is to be received over the air and inserted into at least one User Data message transferred from the RU to the LLS-CU. Downlink and uplink user plane messages may be referred to herein using the terms UP-DL and UP-UL, respectively.

DACI may exist as different types. In some embodiments, the most commonly used type of DACI is one with a Section Type 1, which contains information describing how regular transmissions are to be performed. In some embodiments, a Section Type 1 DACI message includes a list of Sections, wherein each Section includes:

- An identifier to map the DACI and UP-DL or UP-UL to a Section ID;
- A logical RU_port to support multiple overlapping (in time/frequency) and independent address ranges of identifiers;
- A data direction, which may include at least an UL or a DL direction;
- A range of physical resource blocks (PRBs);
- A range of symbols;
- Information related to which REs in the PRB range relate to the rest of the information;
- A beamforming index and/or weights;
- A compression method for beamforming weights; and
- A format for user data and/or a compression method.

In some embodiments, the UP-DL and UP-UL messages include:

- A corresponding identifier(s) (Section ID and RU_port) as the corresponding Section Type 1 message;
- A format for user data and/or a compression method; and
- One sample per RE, in any of a number of supported formats.

According to existing specifications, one sample per resource element (RE) may be sent in a data plane message for all REs in a physical resource block (PRB). Each sample includes a plurality of bits, for example, 30 bits. For symbols where only reference symbols are sent, samples for all REs may need to be sent for the "0"s in the reference symbol as well. When the reference signals are sent simultaneously in all sectors of a gNB, the LLS-CU may transmit full bitrate/bandwidth to all radios for this symbol. For that reason, the possible pooling gain may be reduced.

Figure 6:
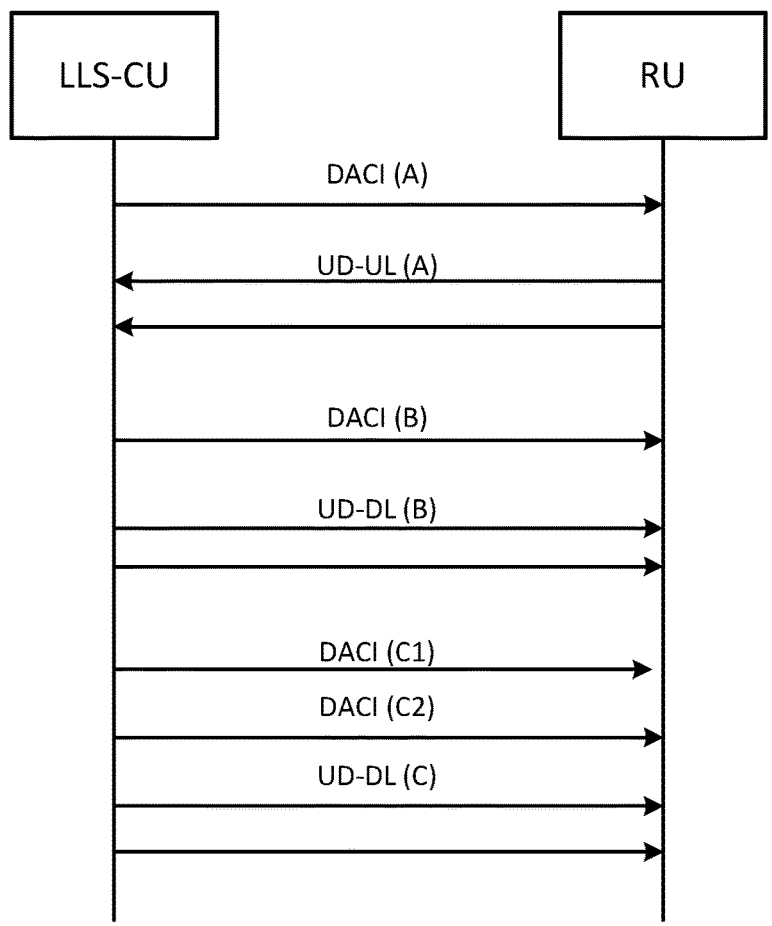
FIG. 6 is a signal flow diagram illustrating an example of signals related to DACI messages according to some embodiments.

FIG. 6 depicts a signal flow diagram related to DACI messages according to some embodiments. As illustrated, one embodiment of DACI(A) is directed to a DACI message sent from the LLS-CU to the RU with information describing a coming reception. In this manner, the RU sends one or more UP-UL messages in correspondence with the request including samples of the received signal over the air. In another embodiment, DACI(B) is directed to a DACI message sent from the LLS-CU to the RU with information describing a coming transmission. The LLS-CU in this embodiment is related to transmitting one or more UP-DL messages containing the information to be transmitted into the air. In yet another embodiment, DACI(C) is directed to two different DACI messages sent from the LLS-CU to the RU with information describing a coming transmission. The two DACI messages describe at least one transmission method for different RE in the same symbol in the same PRB. The LLS-CU in this embodiment then transmits one or more UP-DL messages containing the information to be transmitted into the air, combined for the two DACI.

Figure 7:
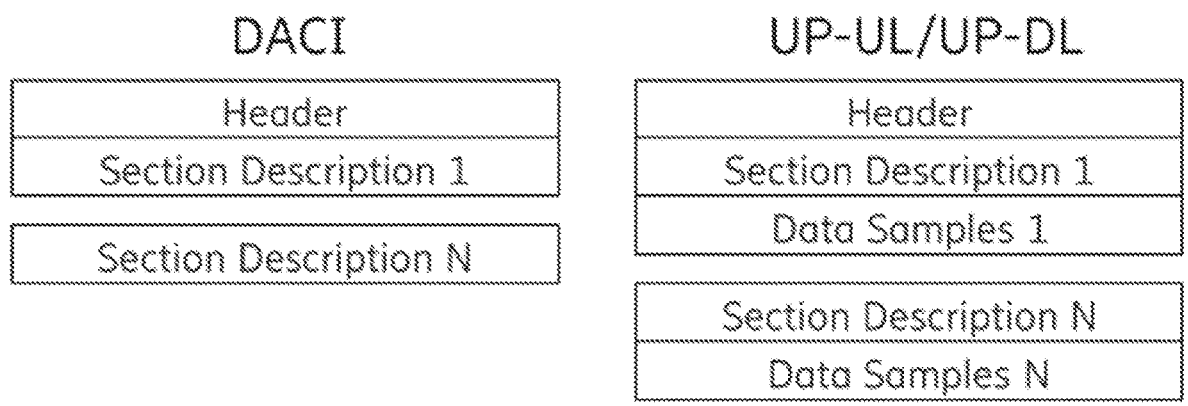
FIG. 7 is a diagram illustrating an example of a DACI and UP-UL/UP-DL according to some embodiments.

FIG. 7 depicts a high level of a protocol of the DACI message and UP-UL/UP-DL messages which carry UP-UL and UP-DL, respectively. In some embodiments, the DACI messages contain a common header, indicating the RU_Port_ID for the DACI, and then a variable set of Sections, each describing a coming transmission. In some embodiments, the UP-UL and UP-DL messages include a common header, indicating the RU_Port_UD for the UP-xx message, and then a variable set of sections, each including a section header indicating the content of the data field, and a data field, containing UP-UL or UP-DL data. The section header according to some embodiments also includes a SectionID to map to the corresponding Section of the DACI message and the format of the data in the data field.

In some embodiments, user data carried in the UP-DL message from the LLS-CU to the RU may include reference symbols that have been mapped to REs. According to some embodiments, the user data transferred to the RU in the UP-DL message can be compressed for transmission to the RU using a bitmap representation that indicates which samples or resource elements (REs) should not be further transferred and which ones that should be transferred.

In some examples, resource elements (REs) are known to carry 0's. For a PRB with only reference symbols being transferred, most of the REs in the PRB will carry a 0, i.e. the RE will be empty. In the protocol specification for DACI, there already exists a means to signal which REs in a UP-DL message are marked as empty, namely, the reMask field. However, the DACI protocol specification indicates that REs marked as empty shall still have data samples transferred in the related UP-DL and UP-UL transmission.

The protocol also allows for multiple DACI sections to point to the PRB(s) with different reMask sets, to allow for different control (e.g., beam forming) for the different sets of REs in the PRB(s). The current protocol allows for two DACI messages pointing to the same PRB for the RU_port_ID. The corresponding UP-DL and UP-UL are still combined into one packet for both those DACI sections.

Figures 8A, 8B:
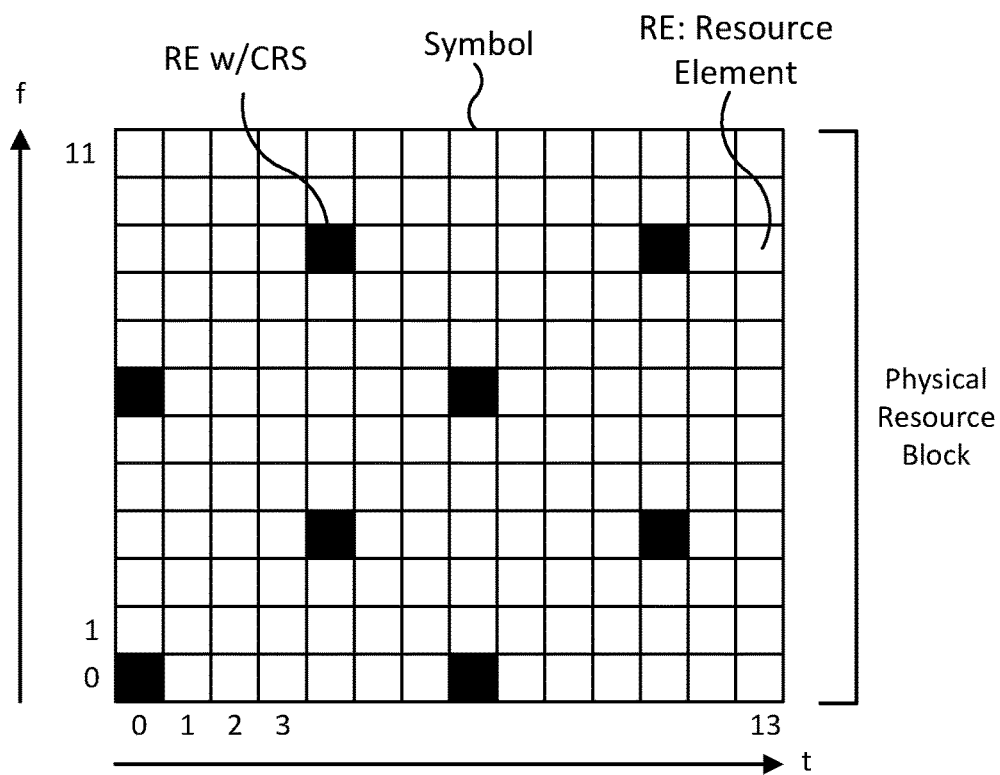
FIG. 8A illustrates an example of a mapping of resource elements to a physical resource block according to some embodiments.
FIG. 8B illustrates a bitmap in matrix form according to some embodiments.

FIG. 8A illustrates a physical resource block (PRB) to which data to be transmitted in the UP-DL message from the LLS-CU to the RU is mapped, where the PRB includes cell-specific reference symbols (CRS) in predefined locations within the PRB. The PRB spans 14 OFDM symbols in the time dimension (horizontal axis) and 12 frequency subchannels in the frequency dimension (vertical axis). Each time/frequency element in the PRB corresponds to an RE of the PRB. As shown in FIG. 8A. the PRB includes two REs carrying CRS in symbols 0, 4, 7 and 11. In this example, all other REs in the PRB carry zeros. In general, some REs in a PRB are known to carry zeros; in PRBs in which only reference symbols are carried, most of the REs will carry a zero.

Some embodiments compress the UP-DL data in the UP-DL message from the LLS-CU to the RU using a bitmap representation of the mapped data to reduce the bandwidth requirements of the UP-DL message. The bitmap representation can be carried in the corresponding DACI message and/or in a header of the UP-DL message. When the bitmap is sent, data corresponding to the REs carrying zeros need not be included in the UP-DL message.

In some embodiments, the reMask field of the DACI can be used as the bitmap, and a field can be added in the DACI corresponding to a UP-DL message that indicates that only those bits set to 1 in the reMask are to be transferred. This can cause the UP-DL to avoid including the unused REs in the data message. In some examples, this field may be included in the udCompHdr field of a DACI message.

In additional or alternative embodiments, a bitmap field can be added in the UP-DL message itself to indicate how to map the samples in the UP-DL message to the REs. For example, the bitmap may include a list of bits indicating which of the REs are not sent and those that are sent. For example, a '0' in the bitmap indicates that the corresponding RE carries a zero and that a sample is not sent for that RE, while a '1' in the bitmap indicates that the corresponding RE carries a non-zero value and that a sample is sent for that RE. The format of the reMask can be reused for this purpose. This can ensure that the LLS-CU and RU have the same understanding of what samples are included in the UP-DL message. If this field is excluded from the UP-DL message, a missing DACI message indicating that some REs are to be transferred can result in misinterpretation of which samples belong to which REs. In some examples, the bitmap field can be included in the UdCompHdr field of the UP-DL message.

Referring still to FIG. 8A, a bitmap may be generated that represents the presence of zero and nonzero samples in the PRB, wherein the bitmap depicts mapped data including REs and corresponding reference symbols. For example, the symbols may be described as columns in the bitmap such that symbols 0 and 7 in the PRB correspond to 10000010000b in the bitmap, symbols 4 and 11 correspond to 000100000100b in the bitmap, and symbols 1, 2, 3, 5, 6, 8, 9, 10, 12, and 13 correspond to 000000000000b in the bitmap. Accordingly, the bitmap may be represented in matrix form as shown in FIG. 8B.

According to some embodiments, samples corresponding '0's in the bitmap (which correspond to REs carrying zero values) are not transmitted in the UP-DL message, while only those samples corresponding to '1's in the bitmap are transmitted. Accordingly, the bandwidth of the UP-DL message can be significantly reduced.

It will be appreciated that user data carried in the UP-DL message may also be compressed. The compression described herein can be performed in addition to such data compression (i.e., "on top of" the "compression).

In some embodiments, compressing user data using a bitmap representation can reduce the bit rate on the fronthaul interface during low or normal operation of the radio unit, allowing for more pooling of shared links.

Figure 9:
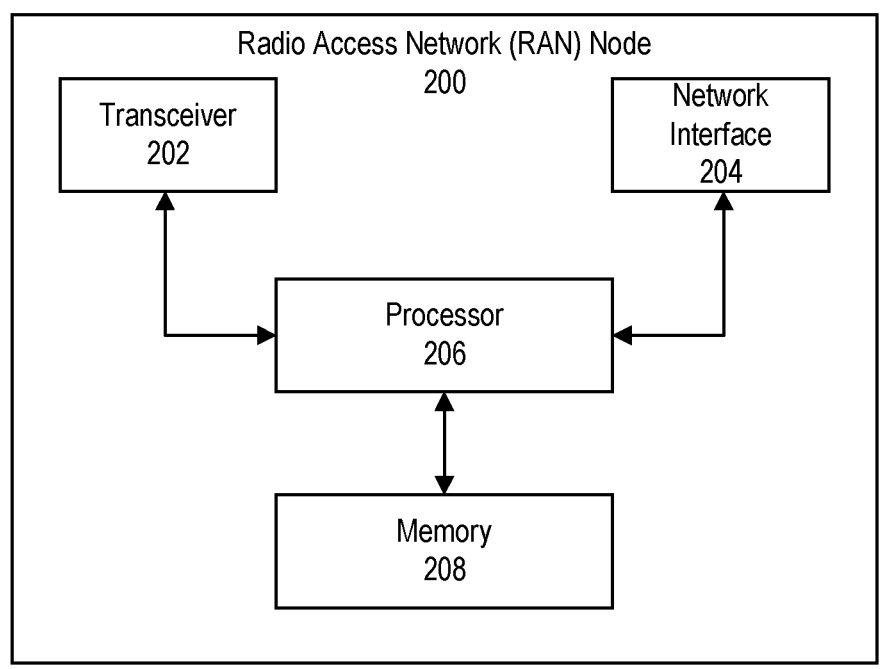
FIG. 9 is a block diagram illustrating an example of a radio access network (RAN) node according to some embodiments.

FIG. 9 depicts an example of a RAN node 200 (also referred to as a network node, base station, eNB, eNodeB, gNB, gNodeB, etc.) of a wireless communication network configured to provide cellular communication according to embodiments of inventive concepts. The RAN node 200 may correspond to a central unit, a radio unit or a combination of a central unit and a radio unit in a RAN node. As shown, RAN node 200 may include a transceiver circuit 202 (also referred to as a transceiver) including a transmitter and a receiver configured to provide uplink and downlink radio communications with wireless devices. The RAN node 200 may include a network interface circuit 204 (also referred to as a network interface) configured to provide communications with other nodes (e.g., with other base stations and/or core network nodes) of the wireless communication network. The RAN node 200 may also include a processor circuit 206 (also referred to as a processor) coupled to the transceiver circuit 202, and a memory circuit 208 (also referred to as memory) coupled to the processor circuit 206. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the RAN node 200 may be performed by processor 206, network interface 204, and/or transceiver 202. For example, processor 206 may control transceiver 202 to transmit downlink communications through transceiver 202 over a radio interface to one or more UEs and/or to receive uplink communications through transceiver 202 from one or more UEs over a radio interface. Similarly, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations (e.g., operations discussed below with respect to example embodiments). In addition, a structure similar to that of FIG. 9 may be used to implement other network nodes, for example, omitting transceiver 202. Moreover, network nodes discussed herein may be implemented as virtual network nodes.

Operations of a RAN node, such as a gNB, will now be discussed with reference to the flow chart of FIG. 10. For example, modules may be stored in memory 208 of FIG. 9 and these modules may provide instructions so that when the instructions of a module are executed by processor 206, processor 206 performs respective operations of the flow chart of FIG. 10. Although FIG. 10 is described below in relation to the RAN node 200 depicted in FIG. 9, the process could be executed by any node in a 5G network.

Figure 10:
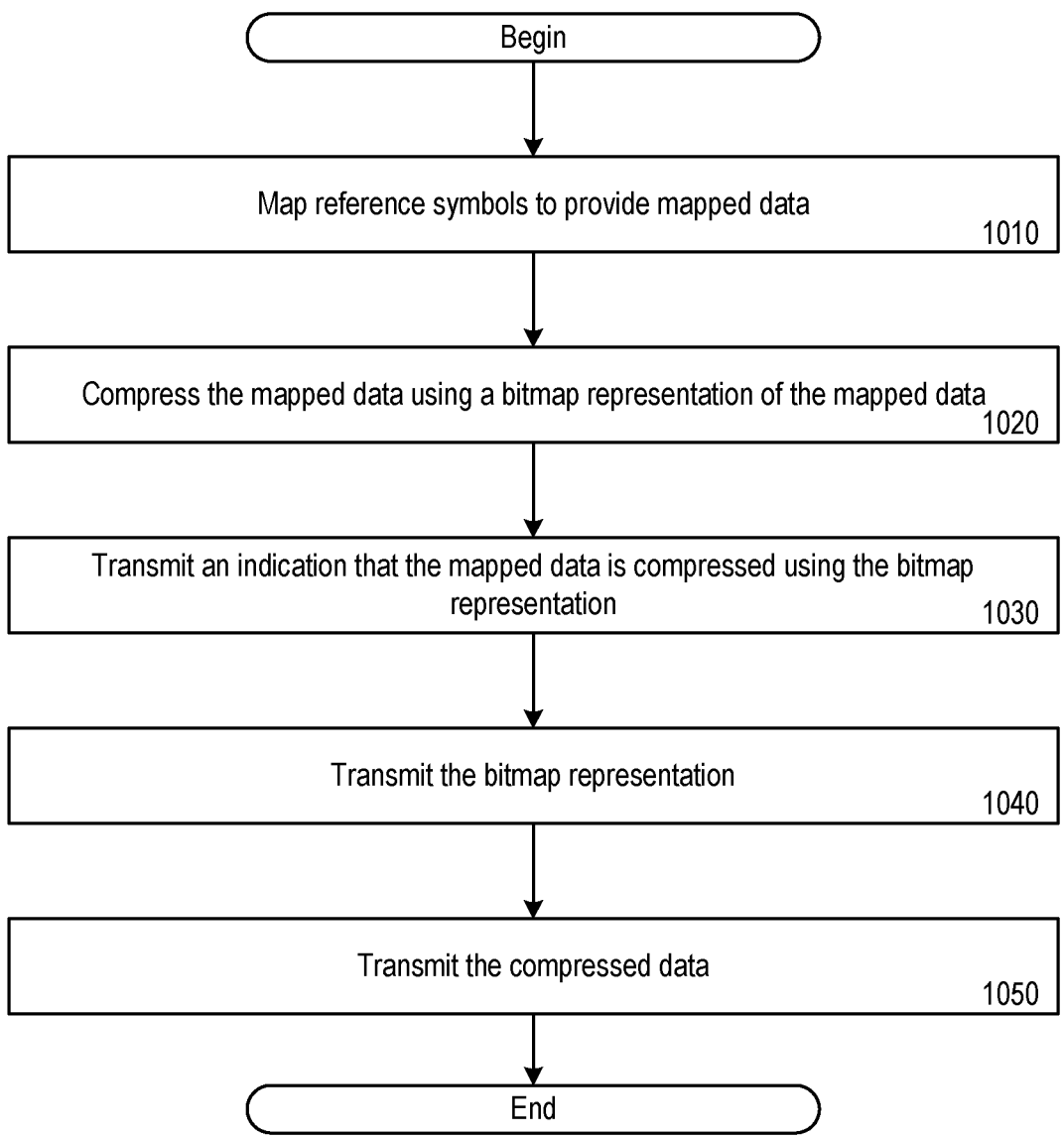
FIG. 10 is a flow chart illustrating an example of a process for transmitting user data from a unit (e.g., a lower-layer split central unit (LLS-CU)) in a network node to another unit (e.g., a radio unit (RU)) in a network node according to some embodiments.

FIG. 10 depicts an example of operations for transmitting user data from a one unit in a network node to another unit in a network node. Although FIG. 10 is described below in reference to a LLS-CU transmitting to a RU for transmission by the RU over a wireless interface, other implementations are possible. For example, the operations can be performed in reference a RU transmitting to a LLS-CU.

At block 1010, processor 206 maps reference symbols to be transmitted by the RU to resource elements to provide mapped data. In some embodiments, the reference symbols include cell-specific reference signals (CRS). In some embodiments, the processor 206 maps user data along with the reference symbols to provide the mapped data.

At block 1020, processor 206 compresses the mapped data using a bitmap representation of the mapped data to obtain compressed mapped data. Compression of the mapped data using a bitmap representation of the mapped data may be a lossless compression technique. In some embodiments, the bitmap representation of the mapped data corresponds to a physical resource block (PRB) and includes bit positions that correspond to resource elements in the PRB. In additional or alternative embodiments, the user data in the mapped data has already been compressed.

At block 1030, processor 206 transmits an indication that the mapped data has been compressed using the bitmap representation, and at block 1040, the processor 206 transmits the bitmap representation to the RU. In some embodiments, the indication may be transmitted in a data-associated control information (DACI) message carrying the bitmap representation of the mapped data. The indication can be carried in a udCompHdr field or a udCompParam field of the DACI message. The bitmap representation may be carried in a reMask field of the DACI message. In additional or alternative embodiments, the indication and/or the bitmap representation may be transmitted to the RU in a user plane-downlink (UP-DL) message that carries the compressed mapped data as user data-downlink (UP-DL) data. The bitmap representation may include a signal regarding the mapping of the resource elements. The signal may include a list of bits that are not sent and a list of bits that are sent in the UP-DL message.

In some examples, the DACI message may include a first section that corresponds to the PRB and includes a first resource element mask or reMask that identifies a first set of resource elements in the PRB. The DACI message may include a second section that corresponds to the PRB and includes a second resource element mask or reMask that identifies a second set of resource elements in the PRB that is different from the first set of resource elements in the PRB. The first and second sets of resource elements in the PRB can include different beam forming parameters. In additional or alternative examples, the DACI message includes a field that causes only non-zero bits to be transferred. The field may be in a udCompHdr field.

At block 1050, processor 206 transmits the compressed mapped data from the LLS-CU to the RU. In some embodiments, the compressed mapped data is transmitted to the RU in a UP-DL message.

Various operations from the flow chart of FIG. 10 may be optional with respect to some embodiments and related methods. Regarding methods of example embodiments 1 and 17 (set forth below), for example, operations of block 1030 of FIG. 10 may be optional. Additionally, the order of operations corresponding to blocks 1010, 1020, 1030, and 1040 of FIG. 10 is merely an example order. As such, the operations corresponding to blocks 1010, 1020, 1030, and 1040 of FIG. 10 may be performed in different orders other than what is illustrated.

Figure 11:
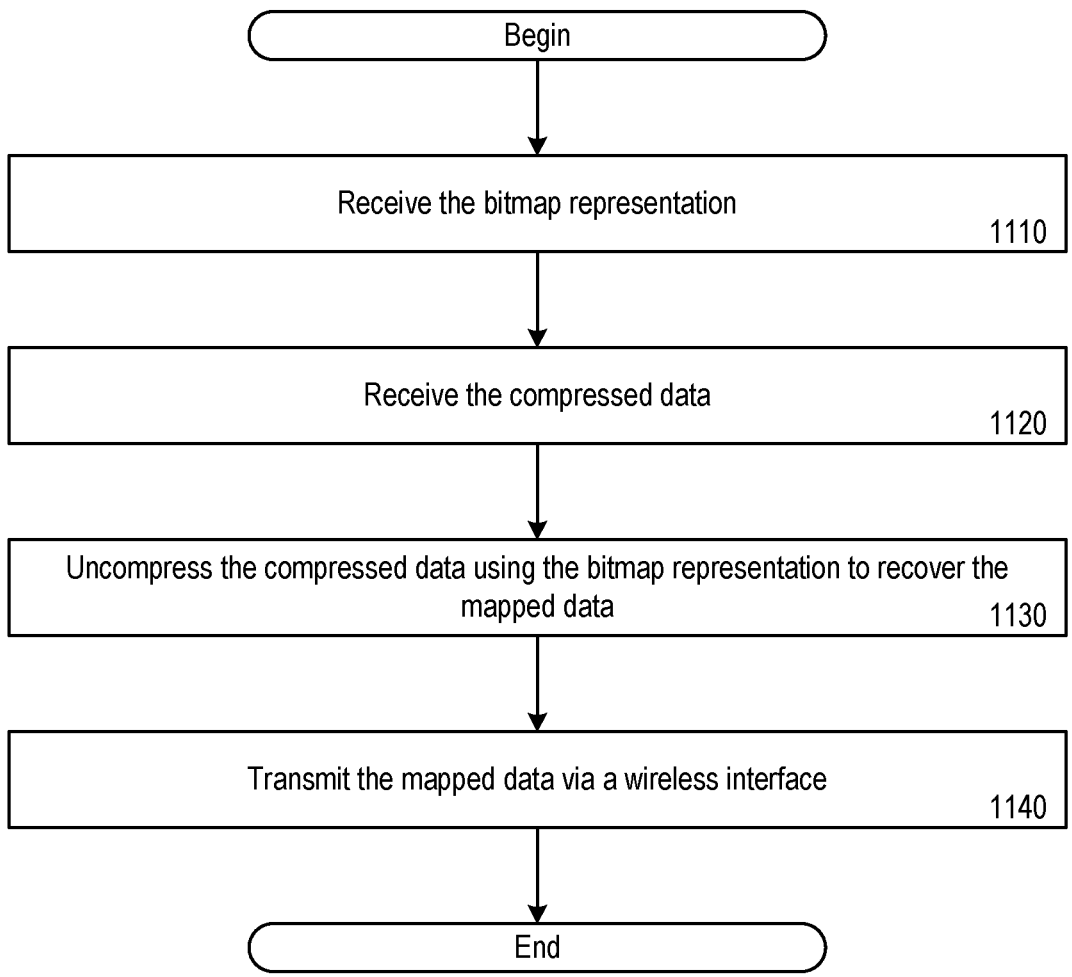
FIG. 11 is a flow chart illustrating an example of a process for receiving user data by a unit (e.g., a RU) in a network node from another unit (e.g., a LLS-CU) in the network node according to some embodiments.

FIG. 11 depicts an example of one unit in a network node receiving user data from another unit in the network node. Although FIG. 11 is described below in reference to a RU receiving from a LLS-CU, other implementations are possible. For example, the operations can be performed in reference a LLS-CU receiving from a RU.

At block 1110, processor 206 receives the bitmap representation at the RU. At block 1120, processor 206 receives the compressed data. At block 1130, processor 206 uncompresses the compressed data using the bitmap representation to recover the mapped data. For example, the processor 206 may insert zeros in the UP-DL data at locations corresponding to zeros in the bitmap representation. At block 1140, processor 206 causes the mapped data to be transmitted over the wireless interface to a UE 100.

Various embodiments describe a network node that includes a processor circuit, a transceiver coupled to the processor circuit, and a memory coupled to the processor circuit. The memory includes machine-readable computer program instructions that, when executed by the processor circuit, cause the processor circuit to perform some of the operations depicted in FIGS. 10-11.

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

1. A method of transmitting user data from a lower-layer split central unit, LLS-CU, to a radio unit, RU, in a network node of a wireless communication system for transmission by the RU over a wireless interface, the method comprising:
   mapping (1010), at the LLS-CU, user data and a plurality of reference symbols to be transmitted with the user data by the RU to resource elements to provide mapped data;
   compressing (1020) the mapped data including the plurality of reference symbols using a bitmap representation of the mapped data to obtain compressed data;
   transmitting (1040) the bitmap representation from the LLS-CU to the RU; and
   transmitting (1050) the compressed data from the LLS-CU to the RU.

2. The method of embodiment 1, further comprising:
   transmitting (1030) an indication to the RU that the mapped data comprises the bitmap representation.

3. The method of embodiment 2, wherein the indication comprises a field in a header of a message carrying the bitmap representation of the mapped data.

4. The method of embodiment 3, wherein the field comprises a udCompHdr field or a udCompParam field of a user plane-downlink, UP-DL, message.

5. The method of embodiment 2, wherein the indication comprises a field in a data-associated control information, DACI, message transmitted from the LLS-CU to the RU.

6. The method of embodiment 1, wherein the indication and the bitmap representation are carried in a same message from the LLS-CU to the RU.

7. The method of embodiment 1, wherein the indication, the bitmap representation, and the compressed data are carried in a same message from the LLS-CU to the RU.

8. The method of any previous embodiment, wherein the bitmap representation of the mapped data includes bit positions that correspond to ones of a plurality of resource elements a physical resource block, PRB, to which the mapped data is mapped.

9. The method of embodiment 1, wherein the bitmap representation is transmitted to the RU in a data-associated control information, DACI, message.

10. The method of embodiment 9, wherein the bitmap representation is carried in a reMask field of the DACI message.

11. The method of embodiment 1, wherein the bitmap representation is transmitted to the RU in a user plane-downlink, UP-DL, message in which the compressed data is transmitted.

12. The method of embodiment 11, wherein the bitmap representation comprises a signal regarding the mapping of the resource elements.

13. The method of embodiment 12, wherein the signal comprises a list of samples that are not sent to the RU and a list of samples that are sent to the RU.

14. The method of any previous embodiment, wherein the indication is transmitted in a user plane-downlink, UP-DL, message in which the compressed data is transmitted.

15. The method of any previous embodiment, further comprising:
   receiving (1110) the bitmap representation at the RU;
   receiving (1120) the compressed data at the RU;
   uncompressing (1130) the compressed data using the bitmap representation at the RU to recover the mapped data; and transmitting (1140) the mapped data over the wireless interface.

16. The method of any previous embodiment, wherein the user data comprises pre-compressed user data.

17. A network node, comprising:
   a processor circuit;
   a transceiver coupled to the processor circuit; and
   a memory coupled to the processor circuit, wherein the memory comprises machine-readable computer program instructions that, when executed by the processor circuit, cause the processor circuit to perform the operations of any of embodiments 1 to 16.

Explanations for abbreviations from the above disclosure are provided below.

Abbreviation Explanation

3GPP $3^{rd}$ Generation Partnership Project
5G $5^{th}$ Generation Wireless Systems
NG Next Generation
IoT Internet of Things
AKA Authentication and Key Agreement
UICC Universal Integrated Circuit Card
SA2 3GPP architecture working group
SA3 3GPP security group
UP User Plane
LTE Long Term Evolution ($4^{th}$ Generation Wireless System)
CP Control Plane
AS Access Stratum
eNB Evolved Node B
UE User Equipment or End User Device
SMC Security Mode Command
RRC Radio Resource Control
PDCP Packet Data Convergence Protocol
RAN Radio Access Network
CN Core Network
PDU Packet Data Unit
DRB Data Radio Bearer
AN Access Network
(R)AN Both 3GPP and non-3GPP Access Networks
NAS Network Access Stratum
AMF Access and Mobility Management Function
NF Network Function
UDM Unified Data Management
PCF Policy Control Function
DRB-IP Data Radio Bearer Integrity Protected
IE Information Element
QoS Quality of Service
gNB Base Station in 5G
NEF Network Exposure Function
NWDAF Network Data Analytics Function
PCF Policy Control Function
UDM Unified Data Management
UPF User Plane Function
DL Downlink
UL Uplink
LLS Lower Layer Split
LLS-U Lower Layer Split User Plane
LLS-C Lower Layer Split Control Plane
LLS-CU Lower Layer Split Central Unit
PHY Physical Layer
MP Management Plane
SSM Synchronization Status Message
TRX Transceiver For the purposes of the present document, the following terms and definitions may apply.

Control Plane: refers specifically to real-time control between LLS-CU and RU, and should not be confused with the UE's control plane c_eAxC: component eAxC: a portion of an eAxC flow assigned to a specific LLS-CU processing element.

DownLink: data flow towards the radiating antenna (generally on the LLS interface) eAxC: extended Antenna-Carrier: a data flow for a single antenna (or spatial stream) for a single carrier in a single sector.

Lower Layer Split: logical interface between LLS-CU and RU when using a lower layer (intra-PHY based) functional split.

Lower Layer Split User-plane: logical interface between LLS-CU and RU when using a lower layer functional split.

Lower Layer Split Control-plane: logical interface between LLS-CU and RU when using a lower layer functional split.

High-PHY: those portions of the PHY processing on the LLS-CU side of the fronthaul interface, including FEC encode/decode, scrambling, and modulation/demodulation.

lower-layer split—Central Unit: a logical node hosting PDCP/RLC/MAC/High-PHY layers based on a lower layer functional split.

Low-PHY: those portions of the PHY processing on the RU side of the fronthaul interface, including FFT/iFFT, digital beamforming, and PRACH extraction and filtering.

Management Plane: refers to non-real-time management operations between the LLS-CU and the RU: Radio Unit: a logical node hosting Low-PHY layer and RF processing based on a lower layer functional split. This is similar to 3GPP's "TRP" or "LLS-DU" but more specific in including the Low-PHY layer (FFT/iFFT, PRACH extraction).

Synchronization Plane: refers to traffic between the RU or LLS-CU to a synchronization controller which is generally an IEEE-1588 Grand Master (however, Grand Master functionality may be embedded in the LLS-CU).

Slot: this is a group of 14 symbols, for LTE and NR. LTE has a separate slot definition within 3GPP which is 7 symbols but that definition is not used in this specification. So for NR, "slot" in this document means slot as 3GPP defines it, but for LTE "slot" in this document correlates to the LTE "TTI" as defined by 3GPP.

Spatial stream: the data flow on the DL associated with precoded data (may be same as layers or different if there is expansion in the precoding), and on UL associated with the number of outputs from the digital beamforming (sometimes called "beams).

Synchronization Status Message: part of ITU G.781 and G.8264 standards.

TRX: Refers to the specific processing chain in an RU associated with D/A or A/D converters. Due to digital beamforming the number of TRXs may exceed the number of spatial streams, and due to analog beamforming the number of TRXs may be lower than the number of antenna elements.

User Plane: refers to IQ sample data transferred between LLS-CU and RU UL: UpLin: data flow away from the radiating antenna (generally on the LLS interface) XRB: xRAN Resource Block: for LTE this is the same as PRB (Physical Resource Block) but for NR this is the same as CRB (Common Resource Block). In NR there can be a dynamically variable offset between CRB and PRB while this specification wants to use a fixed offset (for operational consistency) which is the case for LTE's PRBs.

Citations for references from the above disclosure are provided below.

Reference [1]: 3GPP TR 23.724 V1.0.0 (2018-07), Technical Specification Group Services and System Aspects; Study on Cellular IoT support and evolution for the 5G System (Release 16); and Reference [2]: CRAN-FH.CUS.0-v02.00, published July 27-2018 on www.xran.org Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 12:
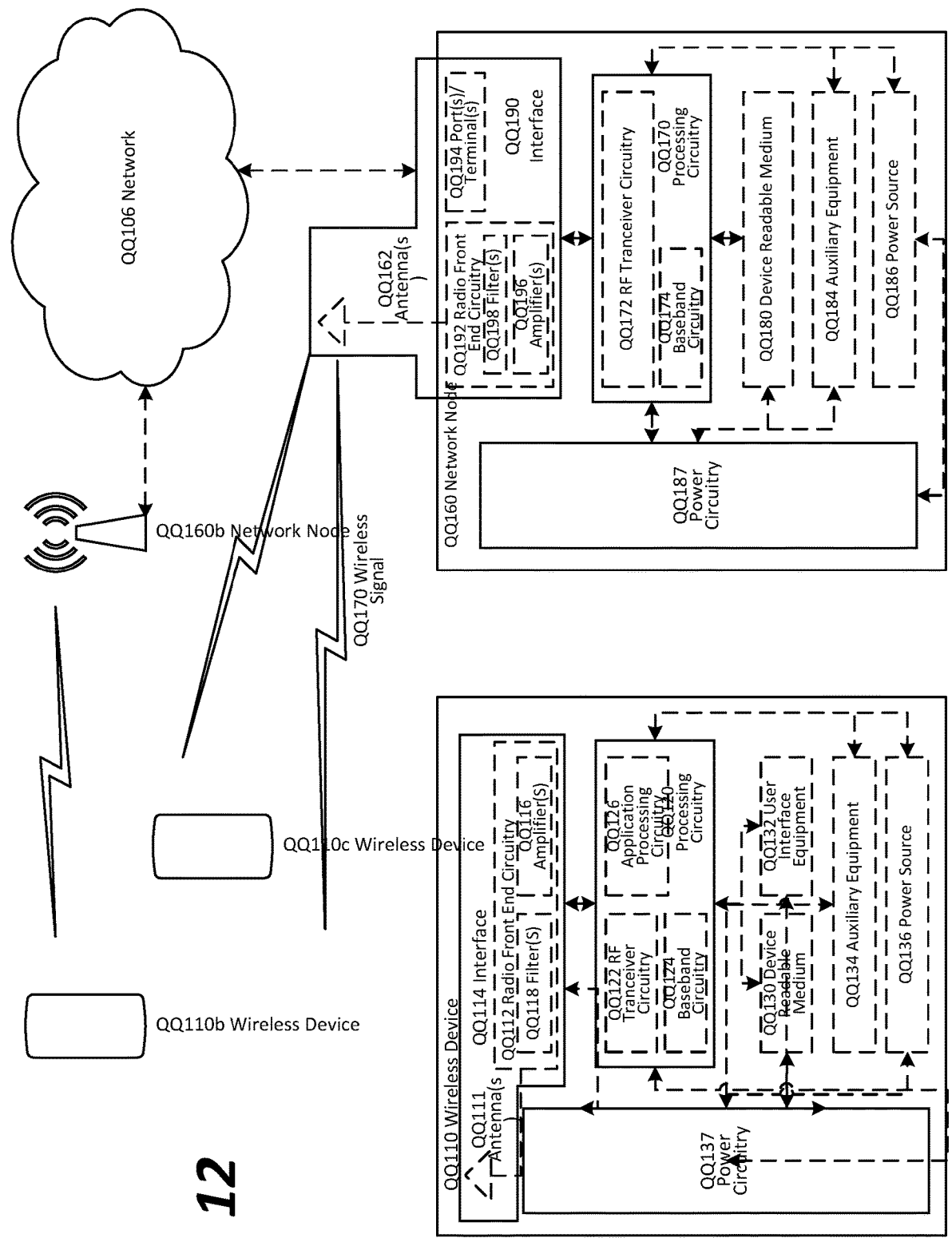
FIG. 12 is a block diagram of a wireless network in accordance with some embodiments.

FIG. 12: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
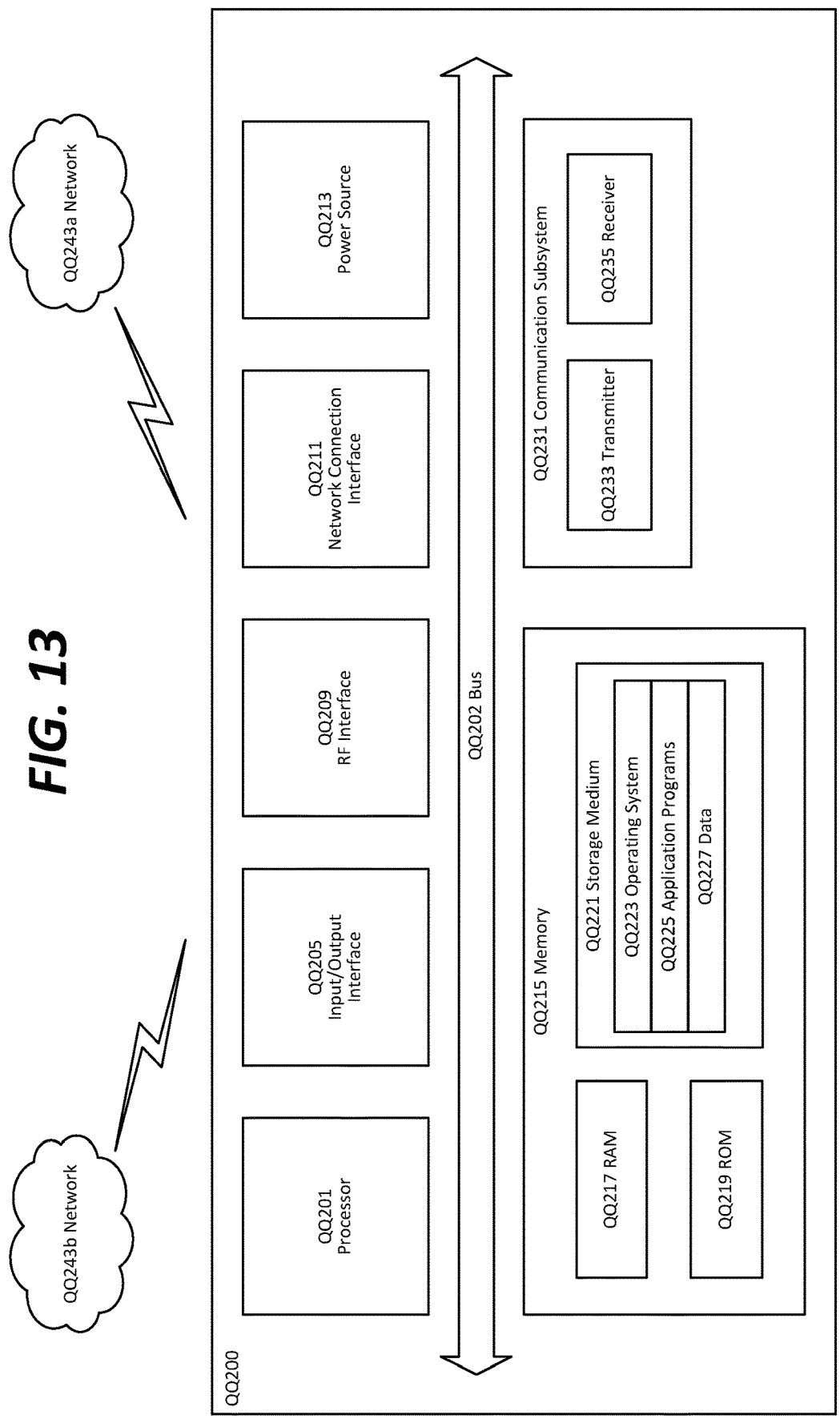
FIG. 13 is a block diagram of a user equipment in accordance with some embodiments

FIG. 13: User Equipment in accordance with some embodiments

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

What is claimed is:

1. A method for transmitting data between a lower-layer split central unit (LLS-CU) and a radio unit (RU) in a network node of a wireless communication system, the method comprising:
   transmitting, from the LLS-CU to the RU, a data-associated control information (DACI) message that includes an indication of one or more resource elements, from a plurality of resource elements, for which data samples do not need to be included;
   determining, at the LLS-CU and based on the indication, that one or more data samples, from a plurality of data samples included in a user data message, do not need to be transmitted to the RU;

generating, at the LLS-CU, a compressed user data message that includes a subset of the plurality of data samples, wherein the subset does not include the one or more data samples;

transmitting the compressed user data message from the LLS-CU to the RU.

2. The method of claim 1 wherein determining the one or more data samples is further based on a mapping between a plurality of reference symbols and the plurality of resource elements.

3. The method of claim 2, wherein the indication comprises a bitmap representation of the mapping between the plurality of reference symbols and the plurality of resource elements.

4. The method of claim 1 further comprising transmitting, from the LLS-CU to the RU, an indication that the user data message has been compressed, wherein the indication causes RU to decompress the compressed user data message prior to transmitting the user data message to a user equipment (UE).

5. The method of claim 1, wherein determining the one or more data samples comprises determining, based on the mapping, one or more reference symbols corresponding to the one or more resource elements and determining that data samples corresponding to the one or more reference symbols do not need to be transmitted to the RU.

6. The method of claim 1, wherein the indication indicates that a first resource element included in the plurality of resource elements carries a zero and wherein determining the one or more data samples comprises determining data samples that belong to the first resource element.

7. The method of claim 2, wherein the bitmap representation corresponds to a physical resource block (PRB) and includes bit positions that each correspond to a different resource element in the PRB.

8. One or more non-transitory computer-readable media including instructions that, when executed by one or more processors, cause the one or more processors to perform the steps of:

transmitting, from a lower-layer split central unit (LLS-CU) of a network node to a radio unit (RU) of the network node, a data-associated control information (DACI) message that includes an indication of one or more resource elements, from a plurality of resource elements, for which data samples do not need to be included;

determining, at the LLS-CU and based on the indication, that one or more data samples, from a plurality of data samples included in a user data message, do not need to be transmitted to the RU;

generating, at the LLS-CU, a compressed user data message that includes a subset of the plurality of data samples, wherein the subset does not include the one or more data samples;

transmitting the compressed user data message from the LLS-CU to the RU.

9. The one or more non-transitory computer-readable media of claim 8, wherein determining the one or more data samples is further based on a mapping between a plurality of reference symbols and the plurality of resource elements.

10. The one or more non-transitory computer-readable media of claim 9, wherein the indication comprises a bitmap representation of the mapping between the plurality of reference symbols and the plurality of resource elements.

11. The one or more non-transitory computer-readable media of claim 8, further comprising transmitting, from the LLS-CU to the RU, an indication that the user data message has been compressed, wherein the indication causes RU to decompress the compressed user data message prior to transmitting the user data message to a user equipment (UE).

12. The one or more non-transitory computer-readable media of claim 9, wherein determining the one or more data samples comprises determining, based on the mapping, one or more reference symbols corresponding to the one or more resource elements and determining that data samples corresponding to the one or more reference symbols do not need to be transmitted to the RU.

13. The one or more non-transitory computer-readable media of claim 8, wherein the indication indicates that a first resource element included in the plurality of resource elements carries a zero and wherein determining the one or more data samples comprises determining data samples that belong to the first resource element.

14. The one or more non-transitory computer-readable media of claim 9, wherein the bitmap representation corresponds to a physical resource block (PRB) and includes bit positions that each correspond to a different resource element in the PRB.

15. A method for transmitting data between units a lower-layer split central unit (LLS-CU) and a radio unit (RU) in a network node of a wireless communication system, the method comprising:

receiving, at the RU from the LLS-CU, a data-associated control information (DACI) message that includes an indication of one or more resource elements, from a plurality of resource elements, for which data samples do not need to be included;

receiving, at the RU from the LLS-CU, a compressed user data message that includes a first set of one or more data samples;

determining, based on the indication, a second set of one or more data samples that were not included in the compressed user data message;

generating, at the RU, an uncompressed user data message that includes the first set of data samples and the second set of data samples;

transmitting the uncompressed user data message to a user equipment (UE).

* * * * *